United States Patent
Yoon et al.

(10) Patent No.: US 12,224,425 B2
(45) Date of Patent: Feb. 11, 2025

(54) MAGNETISM ALIGNMENT APPARATUS FOR NEGATIVE ELECTRODES AND METHOD FOR MANUFACTURING NEGATIVE ELECTRODE USING SAME

(71) Applicant: LG Energy Solution, Ltd., Seoul (KR)

(72) Inventors: Jong Su Yoon, Daejeon (KR); Taek Soo Lee, Daejeon (KR); Jin Ho Cho, Daejeon (KR); Shin Wook Jeon, Daejeon (KR); Young Gon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/713,336

(22) PCT Filed: Sep. 13, 2023

(86) PCT No.: PCT/KR2023/013688
§ 371 (c)(1),
(2) Date: May 24, 2024

(87) PCT Pub. No.: WO2024/058534
PCT Pub. Date: Mar. 21, 2024

(65) Prior Publication Data
US 2024/0396014 A1    Nov. 28, 2024

(30) Foreign Application Priority Data
Sep. 15, 2022 (KR) .......... 10-2022-0116154

(51) Int. Cl.
*H01M 4/1393* (2010.01)
*H01F 7/02* (2006.01)
(Continued)

(52) U.S. Cl.
CPC ........ *H01M 4/1393* (2013.01); *H01F 7/0247* (2013.01); *H01M 4/133* (2013.01);
(Continued)

(58) Field of Classification Search
None
See application file for complete search history.

(56) References Cited

U.S. PATENT DOCUMENTS

2011/0289790 A1  12/2011  Kazama et al.
2013/0255074 A1  10/2013  Uchida et al.
(Continued)

FOREIGN PATENT DOCUMENTS

JP    2000057568 A    2/2000
JP        5622059 B2   11/2014
(Continued)

OTHER PUBLICATIONS

International Search Report for PCT/KR2023/013688 mailed Dec. 29, 2023. 3 pages.
(Continued)

*Primary Examiner* — Wyatt P McConnell
(74) *Attorney, Agent, or Firm* — Lerner David LLP

(57) ABSTRACT

A magnetic alignment device for negative electrode and method for manufacturing negative electrode using the same. The magnetic alignment device can measure the loading amount of the negative electrode slurry applied on the negative electrode collector in real time and can easily control the intensity of the magnetic field by adjusting the separation distance of the magnet portion according to the measured negative electrode slurry loading amount, and has an advantage of uniformly high alignment degree of the crystal faces of the carbon-based negative electrode active material contained in prepared negative electrode active layer.

11 Claims, 2 Drawing Sheets

(51) Int. Cl.
   *H01M 4/133* (2010.01)
   *H01M 4/587* (2010.01)
   *H01M 4/02* (2006.01)
   *H01M 10/0525* (2010.01)

(52) U.S. Cl.
   CPC ...... *H01M 4/587* (2013.01); *H01M 2004/027* (2013.01); *H01M 10/0525* (2013.01)

(56) References Cited

U.S. PATENT DOCUMENTS

| | | |
|---|---|---|
| 2017/0033384 A1 | 2/2017 | Cho |
| 2018/0123131 A1 | 5/2018 | Lee et al. |
| 2018/0159118 A1* | 6/2018 | Lee ........................ H01M 4/133 |
| 2019/0190010 A1 | 6/2019 | Ebner et al. |
| 2022/0140343 A1 | 5/2022 | Park et al. |
| 2023/0110084 A1 | 4/2023 | Shin et al. |
| 2023/0187679 A1 | 6/2023 | Kim |

FOREIGN PATENT DOCUMENTS

| | | |
|---|---|---|
| JP | 6691373 B2 | 4/2020 |
| KR | 20030052950 A | 6/2003 |
| KR | 101184544 B1 | 9/2012 |
| KR | 20150031257 A | 3/2015 |
| KR | 20170090720 A | 8/2017 |
| KR | 20180048131 A | 5/2018 |
| KR | 20190049803 A | 5/2019 |
| KR | 20220060017 A | 5/2022 |
| KR | 20220063383 A | 5/2022 |
| KR | 20220068179 A | 5/2022 |
| KR | 20220113110 A | 8/2022 |

OTHER PUBLICATIONS

Written Opinion of the International Searching Authority for PCT/KR2023/013688 mailed Dec. 29, 2023. 3 pages.

* cited by examiner

[FIG. 1]
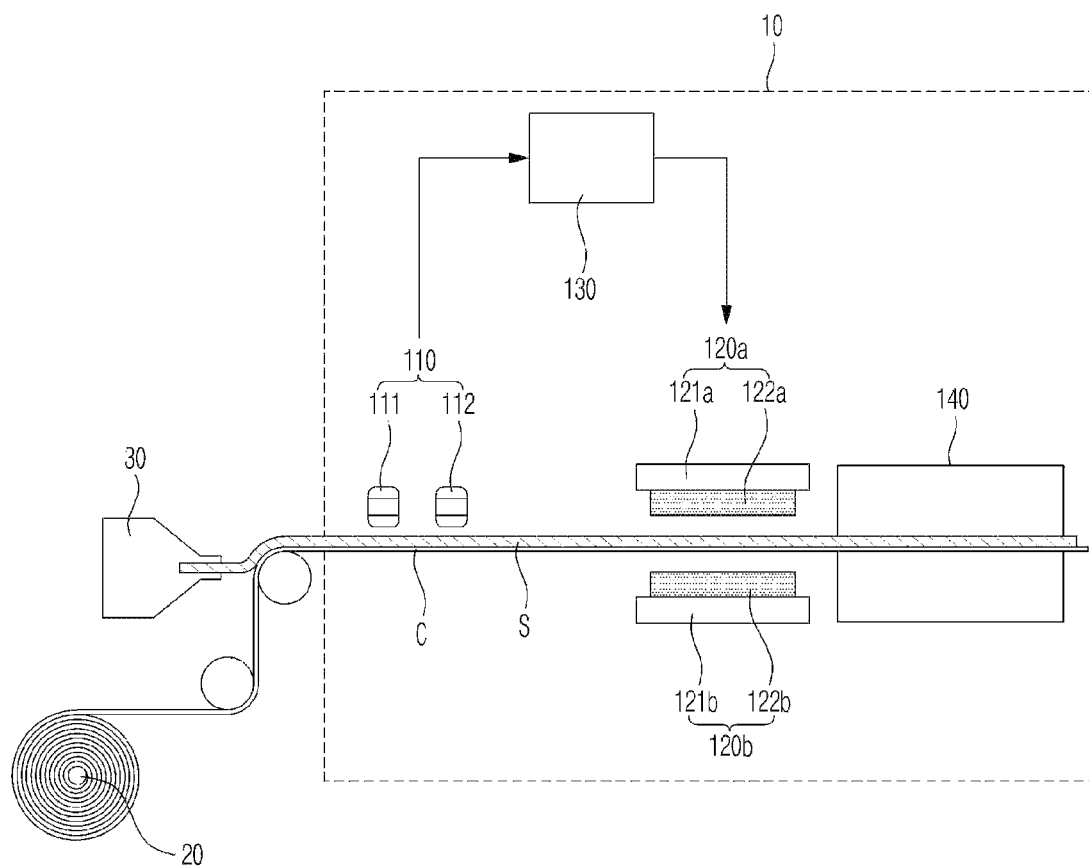

[FIG. 2]
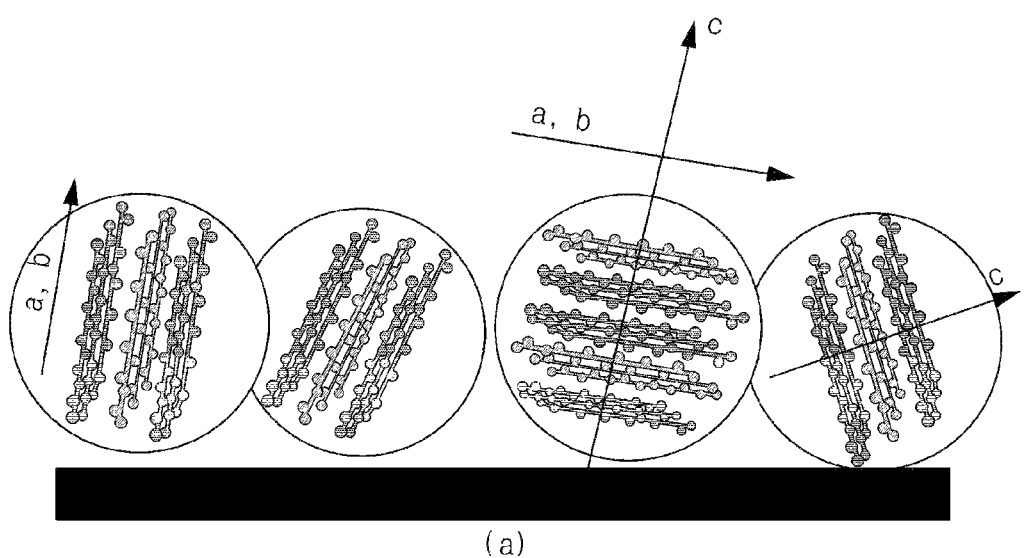
(a)
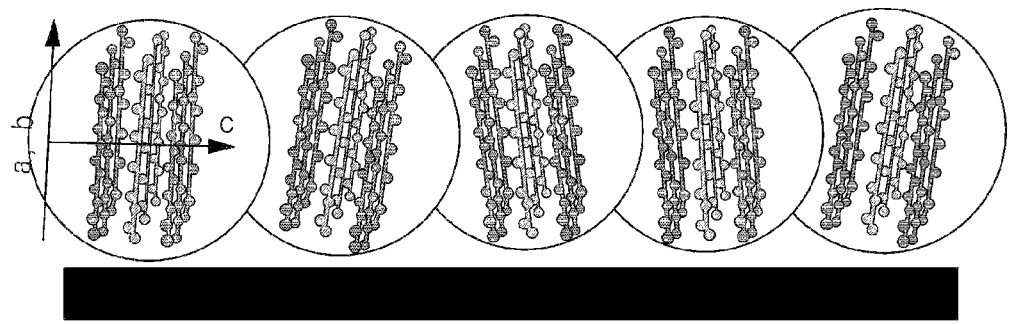

MAGNETISM ALIGNMENT APPARATUS FOR NEGATIVE ELECTRODES AND METHOD FOR MANUFACTURING NEGATIVE ELECTRODE USING SAME

CROSS-REFERENCE TO RELATED APPLICATIONS

The present application is a national phase entry under 35 U.S.C. § 371 of International Application No. PCT/KR2023/013688, filed on Sep. 13, 2023, which claims priority from Korean Patent Application No. 10-2022-0116154, filed on Sep. 15, 2022, all of which are incorporated herein by reference.

TECHNICAL FIELD

The present disclosure relates to a magnetic alignment device capable of uniformly aligning a negative electrode active layer in the manufacture of a negative electrode, and a method for manufacturing a negative electrode using the same.

BACKGROUND ART

Recently, secondary batteries have been widely applied in small devices such as portable electronics, as well as in medium and large devices such as battery packs or power storage in hybrid vehicles or electric vehicles.

Such a secondary battery refers to a power generation element that can be charged and discharged by a laminated structure of a positive electrode, a separator, and a negative electrode. Generally, the positive electrode includes lithium metal oxide as the positive electrode active material and the negative electrode includes a carbon-based negative electrode active material such as graphite, so that lithium ions discharged from the positive electrode are absorbed into the carbon-based negative electrode active material of the negative electrode during charging, and lithium ions contained in the carbon-based negative electrode active material are absorbed into the lithium metal oxide of the positive electrode during discharging, and charging and discharging are repeated.

In this case, the negative electrode active material used for the negative electrode is graphite material such as natural graphite, etc. This graphite has a layered structure and is formed by laminating a number of layers that are spread out in a planar shape with carbon atoms forming a network structure. During charging, lithium ions intercalate to the edges of these graphite layers (where the layers overlap) and diffuse between the layers. Also, during discharging, lithium ions can be deintercalated and released from the edge faces of the layers. In addition, since graphite has a lower electrical resistance in the inplane direction of the layer than in the laminated direction of the layer, a conductive path for diverted electrons is formed along thein plane direction of the layer.

In this regard, a technology for orienting the graphite contained in the negative electrode in a magnetic field has been proposed to improve the charging performance of the negative electrode in a conventional lithium secondary battery using graphite. Specifically, the graphite is oriented so that the (0,0,2) crystal face of the graphite is almost vertical to the negative electrode collector in a magnetic field during the formation of the negative electrode and has a configuration that fixes it. In this case, since the edge of the graphite layer faces the positive active layer, the insertion and removal of lithium ions can be carried out smoothly, and the conductive path of electrons can be shortened to improve the electronic conductivity of the negative electrode, thereby improving the charging performance of the battery.

However, it is possible to induce the orientation of graphite by applying a magnetic field to the undried negative electrode slurry, but the conditions of the applied magnetic field may vary depending on various variables such as the loading amount and thickness of the negative electrode slurry containing graphite, and it is difficult to reflect these variables in real time during actual negative electrode manufacturing, so it is difficult to realize the uniform orientation of graphite.

In addition, various models of negative electrodes with different specifications are manufactured in a single negative electrode manufacturing device, and it is not easy to control the magnetic field application means, i.e., permanent magnets, etc., provided in the manufacturing device according to the specifications of the negative electrode to be manufactured.

Therefore, there is a need for a technology that can easily control the magnetic field application means according to the specifications of the negative electrode to be manufactured, such as the loading amount and thickness of the negative electrode active layer, and/or the conditions for manufacturing the negative electrode, such as the loading amount of the negative electrode slurry, to produce a negative electrode active layer with uniformly aligned crystal faces of a carbon-based negative electrode active material such as graphite, etc.

RELATED ART DOCUMENT

Patent Document

Korean Patent Laid-Open Publication No. 10-2018-0048131

Korean Patent Laid-Open Publication No. 10-2022-0060017

DISCLOSURE

Technical Problem

An object of the present technology is to provide an alignment device capable of uniformly aligning the crystal faces of a carbon-based negative electrode active material contained in a negative electrode active layer by adjusting the intensity of a magnetic field according to the loading amount of a negative electrode slurry containing a carbon-based negative electrode active material, and a method for manufacturing a negative electrode using the same.

Technical Solution

To solve the problem described above, an embodiment of the present invention provides, a magnetic alignment device for a negative electrode in which a negative electrode slurry including a carbon-based negative electrode active material is applied to a negative electrode sheet applied on a negative electrode collector to orient the carbon-based negative electrode active material by applying a magnetic force.

The magnetic alignment device comprises, a first magnet part and a second magnet part arranged at an upper portion and a lower portion of traveling electrode sheet, respectively:

a loading amount measuring part arranged upstream of the first magnet part and the second magnet part relative to the travelling direction of the electrode sheet, and measuring the loading amount of the negative electrode slurry arranged on the electrode sheet; and a control part for adjusting a separation distance between the first magnet part and the second magnet part according to a loading amount of the negative electrode slurry measured by the loading amount measuring part; and a magnetic alignment device for negative electrode.

In this case, the control part is equipped with a database in which the interval reference values of the first magnet part and the second magnet part according to the loading amount of the negative electrode slurry are stored, and the interval reference values corresponding to the loading amount of the negative electrode slurry measured by the loading amount measuring part are calculated to adjust the separation distance of the first magnet part and the second magnet part.

Here, the separation distance between the first magnet part and the second magnet part may be adjusted from 10 mm to 50 mm.

Further, the first and second magnet parts may each include a single permanent magnet arranged in the width direction of the traveling negative electrode slurry: a support part to which the magnet is fixed; and distance adjustment means connected to the support part and inducing a lifting movement of the support part in a direction perpendicular to the traveling electrode sheet.

In addition, the first magnet part and the second magnet part may include magnets having opposite poles.

Further, the loading amount measuring part may include at least one of a web gauge and an ultrasonic sensor, wherein the ultrasonic sensor may include an ultrasonic generating part that injects ultrasonic waves onto a surface of the negative electrode slurry: an ultrasonic receiving part that scans the negative electrode slurry loaded with ultrasonic waves generated by the ultrasonic generating part and receives the returned ultrasonic waves; and a data transmission part that calculates the loading amount of the negative electrode slurry from the data obtained by the scan and transmits it to the control part.

Further, the magnetic alignment device may further include a drying part for drying the negative electrode slurry in which the carbon-based negative electrode active material is aligned by the first magnet part and the second magnet part.

Further, in one embodiment, the present invention includes a method of manufacturing negative electrode.

The method of manufacturing negative electrode comprises, applying a negative electrode slurry including carbon-based negative electrode active material on a negative electrode collector;

aligning the carbon-based negative electrode active material contained in the negative electrode slurry using a magnetic alignment device; and drying the negative electrode slurry in which the carbon-based negative electrode active material is aligned to form a negative electrode active layer, the step of aligning the carbon-based negative electrode active material provides a method of producing a controlled negative electrode by adjusting the spacing between the negative electrode slurry and the magnet part of the magnetic alignment device according to a loading amount of the negative electrode slurry.

In this case, the negative electrode slurry may be applied in a loading amount of 100 mg/25 cu' to 500 mg/25 cm'.

Further, a negative electrode active layer formed on a negative electrode collector may have an alignment degree of the carbon-based negative electrode active material of 0.1 to 5.0, represented by the following Equation 1:

$$O.I = I_{004}/I_{110} \qquad [\text{Equation 1}]$$

in Equation 1, represents the area of the peak representing the (0,0,4) crystal face in an X-ray diffraction spectroscopy (XRD) measurement of the negative electrode active layer, and $I_{110}$ represents the area of the peak representing the (1,1,0) crystal face in an X-ray diffraction spectroscopy (XRD) measurement of the negative electrode active layer.

Advantageous Effects

The magnetic alignment device according to the present disclosure can measure the loading amount of the negative electrode slurry applied on the negative electrode collector in real time and can easily control the intensity of the magnetic field by adjusting the separation distance of the magnet part according to the measured negative electrode slurry loading amount. The negative electrode active layer prepared accordingly has an advantage of uniformly high alignment of the crystal faces of the carbon-based negative electrode active material.

BRIEF DESCRIPTION OF THE DRAWINGS

FIG. 1 is a structural view illustrating a schematic configuration of a magnetic alignment device according to the present disclosure.

FIG. 2 is an image depicting the alignment of the a-b axis crystal faces of graphite according to whether a magnetic field is applied to the negative electrode slurry during the formation of the negative electrode active layer, wherein (a) the crystal faces of graphite are not aligned because a magnetic field is not applied, and (b) the crystal faces of graphite are aligned because a magnetic field is applied.

DETAILED DESCRIPTION OF THE PREFERRED EMBODIMENTS

The present invention is subject to various modifications and can have many different embodiments, and specific embodiments will be described in detail in the following description.

However, this is not intended to limit the present invention to any particular embodiment and should be understood to include all modifications, equivalents, or substitutions that are within the scope of the idea and technology of the present invention.

Throughout this specification, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

Further, when a portion such as a layer, a film, an area, a plate, or the like is referred to as being "on" another portion, this includes not only the case in which the portion is "directly on" the another portion but also the case in which still another portion is interposed therebetween. In contrast, when a portion such as a layer, a film, an area, a plate, or the like is referred to as being "below" another portion, this includes not only the case in which the portion is "directly below" the another portion but also the case in which still another portion is interposed therebetween. In addition, to be disposed "on" in the specification of the present disclosure may include the case disposed at the lower portion as well as the upper portion.

Further, in the present disclosure, "comprising as a major component" may mean comprising 50 wt % or more (or 50 wt % or more by volume), 60 wt % or more (or 60 wt % or more by volume), 70 wt % or more (or 70 wt % or more by volume), 80 wt % or more (or 80 wt % or more by volume), 90 wt % or more (or 90 wt % or more by volume), or 95 wt % or more (or 95 wt % or more by volume) of the defined component relative to the total weight (or total volume). For example, "comprising graphite as the primary component of the negative electrode active material" may mean comprising at least 50 wt %, at least 60 wt %, at least 70 wt %, at least 80 wt %, at least 90 wt %, or at least 95 wt % graphite based on the total weight of the negative electrode active material, and in some cases may mean that the entire negative electrode active material is composed of graphite and comprises 100% graphite.

Further, as used herein, "carbon-based negative electrode active material is oriented" or "carbon-based negative electrode active material is aligned" may mean that certain crystal faces (e.g., a-b axis crystal faces of graphite) representing the two-dimensional planar structure of the carbon-based negative electrode active material comprising the negative electrode active material particles are arranged to have a predetermined tilt relative to the surface of the negative electrode collector, as shown in (b) of FIG. 2. This may be different from the carbon-based cathode active material particles themselves being oriented in a predetermined direction only within the negative electrode active layer and not with respect to the negative electrode collector, as shown in (a) of FIG. 2.

In addition, "highly oriented carbon-based negative electrode active material" may mean that certain crystal faces (e.g., a-b axis crystal faces of graphite) representing the two-dimensional planar structure of the carbon-based negative electrode active material contained in the negative electrode active layer have a high frequency of having a predetermined tilt relative to the negative electrode collector surface. It may also mean, in some cases, that the crystal faces of the carbon-based negative electrode active material contained in the negative electrode active layer are arranged at a high angle (e.g., a near-vertical angle, greater than 45°; specifically greater than) 60° relative to the negative electrode collector surface.

In addition, "high alignment of the carbon-based negative electrode active material" means that the "alignment (O.I.)" referred to herein has a large value, which may mean that certain crystal faces (e.g., a-b axis crystal faces of graphite) representing the two-dimensional planar structure of the carbon-based negative electrode active material contained in the negative electrode active layer are arranged at a low angle (e.g., less than) 45° relative to the surface of the negative electrode collector. Conversely, "low alignment of the carbon-based negative electrode active material" may mean that the "degree of alignment (O.I.)" has a small value, such that the crystal faces of the carbon-based negative electrode active material contained in the negative electrode active layer are arranged at a high angle (e.g., an angle close to vertical, greater than 45°: specifically greater than) 60° relative to the surface of the negative electrode collector.

Moreover, as used herein, "average particle diameter ($D_{50}$)" means the particle diameter at which the sum value is 50% in the particle diameter distribution of the particles, which is also referred to as the median diameter.

Hereinafter, the present invention will be described in more detail.

Magnetic Alignment Device of Negative Electrode

In one embodiment, the present disclosure provides a magnetic alignment device for a negative electrode, in which a negative electrode slurry comprising a carbon-based negative electrode active material is aligned by applying a magnetic force to a negative electrode sheet applied to a negative electrode collector.

The magnetic alignment device comprises,
　a first magnetic part and a second magnetic part arranged at an upper portion and a lower portion of the traveling electrode sheet, respectively;
　a loading amount measuring part arranged upstream of the first magnet part and the second magnet part relative to the traveling direction of the electrode sheet, and measuring a loading amount of the negative electrode slurry arranged on the electrode sheet; and
　a control part for adjusting a separation distance of the first magnet part and the second magnet part according to a loading amount of the negative electrode slurry measured by the loading amount measuring part; and a magnetic alignment device for the negative electrodes.

The magnetic alignment device of a negative electrode according to the present disclosure refers to a device applied in the manufacture of a negative electrode used in a secondary battery. The magnetic alignment device is capable of aligning the carbon-based negative electrode active material contained in the negative electrode slurry in a direction perpendicular to the negative electrode collector by applying a magnetic field to a surface of the negative electrode collector to which the negative electrode slurry containing the carbon-based negative electrode active material is applied, that is, to the surface of the negative electrode slurry. Here, the magnetic alignment device can control the magnetic field of the traveling negative electrode, that is, the magnet part disposed on the upper and lower parts of the electrode sheet, by measuring the condition of the negative electrode slurry applied to the negative electrode collector, specifically the loading amount of the negative electrode slurry, in real time during the application of the magnetic field. Accordingly, the magnetic alignment device can realize uniform alignment of the carbon-based negative electrode active material contained in the negative electrode slurry, and the negative electrode thus prepared can exhibit the effect of increasing the mobility of the lithium ions and decreasing the resistance during charging and discharging of the battery, thereby improving the charging and discharging performance.

In this case, being aligned in a perpendicular direction to the negative electrode collector means that the crystal faces of the carbon-based negative electrode active material are aligned. Specifically, "the carbon-based negative electrode active material is vertically aligned with the negative electrode collector" may mean that the crystal faces of the carbon-based negative electrode active material comprising the spherical particles, specifically the crystal faces of graphite, which represent the planar direction of graphite having a two-dimensional structure, are arranged vertically aligned with the surface of the negative electrode collector. In this case, the planar direction of the graphite may have an average tilt of 60 to 120° with respect to the negative electrode collector, preferably 70 to 110°: or 80 to 100°.

To achieve this, the magnetic alignment device 10 according to the present disclosure comprises a first magnet part 120a and a second magnet part 120b arranged at the upper and lower portions, respectively, of the traveling electrode sheet, i.e., the negative electrode collector C on which the negative electrode slurry S is applied, as shown in FIG. 1: a loading amount measuring part 110 arranged upstream of the first magnet part 120a and/or the second magnet part 120b relative to the traveling direction of the electrode sheet and measuring the loading amount of the negative electrode slurry(S) on the electrode sheet; and a control part 130 that adjusts the separation distance between the first magnet part 120a and the second magnet part 120b according to the loading amount of the negative electrode slurry measured by the loading amount measuring part.

The loading amount measuring part 110 is located upstream of the first magnet part 120a and/or the second magnet part 120b relative to the traveling direction of the electrode sheet, and serves to measure the loading amount of the negative electrode slurry S before the magnetic field applied by the magnet part affects the negative electrode slurry.

In this case, the loading amount measuring part 110 may be any means/method conventionally used in the art for measuring the loading amount of the negative electrode slurry S, without being particularly limited. Preferably, the loading amount measuring part 110 may comprise a non-contact measuring device that can prevent loss and/or change of state of the negative electrode slurry. As one example, the loading amount measurement part 110 may comprise at least one of a web gauge and an ultrasonic sensor. Here, the ultrasonic sensor may include an ultrasonic generating portion that injects ultrasonic waves onto a surface of the negative electrode slurry; an ultrasonic receiving part that scans the loaded negative electrode slurry with generated ultrasonic waves and receives the returned ultrasonic waves; and a data transmit part that calculates the loading amount of the negative electrode slurry from the data obtained by the scanning and transmits it to the control part.

Further, the loading amount measuring part 110 may measure the loading amount of the negative electrode slurry in real time by arranging two or more non-contact measuring devices in the width direction of the traveling negative electrode slurry S in order to measure the loading amount of the negative electrode slurry S more precisely. The measured loading values are sent to the control part, and the average value can be reflected as the loading amount of the negative electrode slurry. In this case, it is advantageous to measure the loading amount of the negative electrode slurry applied using a die coater or the like more precisely.

Furthermore, the loading amount measurement part 110 may include two or more non-contact measuring devices along the traveling direction of the electrode sheet. Specifically, the loading amount measuring part 110 may comprise a first measuring instrument 111 and a second measuring instrument 112 arranged successively along the traveling direction of the electrode sheet. In this case, the error rate for the loading amount of the negative electrode slurry, which is measured in real time, can be lowered.

The control part 130 may play a role in controlling a separation distance between the first magnet part 120a and the second magnet part 120b. To achieve this, the magnetic alignment device 10 may receive the measured loading amount of the negative electrode slurry S from the loading amount measuring part 110, compare the measured negative electrode slurry loading amount with the spacing reference value, recognize the spacing reference value corresponding to the measured negative electrode slurry loading amount, and transmit the recognized spacing reference value to the first magnet part 120a and the second magnet part 120b respectively to adjust the separation distance of the first magnet part 120a and the second magnet part 120b.

In this case, the spacing reference value is a value indicating the spacing, i.e., the separation distance, of the first magnet part 120a and the second magnet part 120b according to the loading amount of the negative electrode slurry, and this value may be stored in a data base (not shown) provided in the control part 130. The spacing reference value may be a value stored in the database by obtaining data on the spacing distance between the first magnet part 120a and the second magnet part 120b according to the loading amount of the negative electrode slurry S using a conventionally installed prior measurement device, and selectively selecting only the data in which the alignment of the carbon-based negative electrode active material contained in the negative electrode slurry is most effectively realized among the obtained data.

Further, the negative electrode slurry S may have a different content of carbon-based negative electrode active material, depending on the density (or concentration) of carbon-based negative electrode active material contained in the negative electrode slurry, even for the same loading amount. In addition, the content of the carbon-based negative electrode active material affects the alignment of the crystal faces with respect to the negative electrode collector (C), so that the magnetic field strength can be adjusted according to the content during the alignment. Therefore, the database may further include information on the separation distance of the first magnet part 120a and the second magnet part 120b according to the loading amount of the negative electrode slurry S, as well as information on the density (or concentration) of the carbon-based negative electrode active material in the negative electrode slurry by the loading amount of the negative electrode slurry S for correcting the loading amount of the negative electrode slurry.

Furthermore, the spacing reference value stored in the database may be a value reflecting the data on the density (or concentration) of the carbon-based negative electrode active material in the negative electrode slurry stored in the database, since the density (or concentration) of the carbon-based negative electrode active material may affect the magnetic field strength for compensation for the loading amount of the negative electrode slurry(S) as mentioned above.

Moreover, in the magnetic alignment device 10, the first magnet part 120a and the second magnet part 120b are arranged at the upper and lower portions of the traveling electrode sheet, respectively, to play a role in applying a magnetic field to the surface of the negative electrode slurry S.

The first magnet part 120a and the second magnet part 120b may include magnets 122a and 122b, respectively, for applying a magnetic field to the surface of the negative electrode slurry S, and means 121a and 121b for adjusting a spacing, i.e., a separation distance, between them by performing a lifting movement on the upper and lower parts of the negative electrode slurry, respectively. Specifically, the first magnet part 120a and the second magnet part 120b may each include single permanent magnets 122a and 122b arranged in the width direction of the traveling negative electrode slurry: a support part (not shown) on which the single permanent magnets are fixed; and distance adjustment means 121a and 121b connected to the support part, which induce a lifting movement of the support part (or a lifting movement of the single magnet) in a direction perpendicular to the traveling electrode sheet.

In this case, the distance adjustment means 121a and 121b may receive a spacing reference value from the control part 130 and operate to adjust the separation distance of the first magnet part 120a and the second magnet part 120b in accordance with the received spacing reference value.

By having such a configuration, the first magnet part 120a and the second magnet part 120b can facilitate controlling the intensity of the magnetic field applied to the negative electrode slurry S by adjusting their separation distance. That is, the first magnet part 120a and the second magnet part 120b can increase the intensity of the magnetic field applied to the negative electrode slurry S as the separation distance decreases, and decrease the intensity of the magnetic field applied to the negative electrode slurry S as the separation distance increases.

Further, the first magnet part 120a and the second magnet part 120b may be positioned in the width direction of the negative electrode slurry S so as to face each other, and may be arranged to have opposite poles. For example, the N pole of the first magnet 122a of the first magnet part 120a and the S pole of the second magnet part 120b may be facing each other, or the S pole of the first magnet 122a of the first magnet part 120a and the N pole of the second magnet 122b of the second magnet part 120b may be facing each other. When the electrode sheet passes through the space between the N and S poles facing each other in this manner, vertical alignment of the carbon-based negative electrode active material with respect to the negative electrode collector C between the first magnet part 120a and the second magnet part 120b can be more effectively achieved.

Additionally, the first magnet part 120a may be arranged at the upper portion of the traveling electrode sheet, but a Halbach arrangement may be applied to the first single permanent magnet 122a to apply a high magnetic field to the carbon-based negative electrode active material of the negative electrode slurry S. Here, the Halbach arrangement is a permanent magnet arrangement that can provide a magnet with a high magnetic field strength by gradually changing the magnetization direction of the magnet. When a magnet having a Halbach arrangement is applied as the magnet 122a of the first magnet part 120a, it is advantageous to be able to adjust the intensity of the magnetic field applied to the negative electrode slurry S without significantly changing the separation distance between the first magnet part 120a and the second magnet part 120b.

Meanwhile, the separation distance of the first magnet part 120a and the second magnet part 120b may be 10 mm to 50 mm, more specifically, 10 mm to 40 mm: 20 mm to 50 mm: or 15 mm to 45 mm, and the separation distance of the first magnet part 120a and the second magnet part 120b may be the same as the separation distance of the first single permanent magnet 122a and the second single permanent magnet 122b. By adjusting the separation distance of the first magnet part 120a and the second magnet part 120b to the above range, the present technology can perform alignment of the carbon-based negative electrode active material contained in the negative electrode slurry S more efficiently.

In addition, the magnetic alignment device 10 may further include a drying part 140 for drying the negative electrode slurry S in which the carbon-based negative electrode active material is aligned by the first magnetic part 120a and the second magnetic part 120b.

The drying part 140 is formed by including a wall body (not shown) that blocks the periphery except for the take in and take out of the electrode sheet to which the slurry S is applied, and a dryer (not shown) for drying the electrode sheet on the wall of the side from which the electrode sheet to which the electrode slurry is applied is taken out.

When the electrode sheet to which the electrode slurry is applied enters through the inlet of the drying part 140, it receives energy such as light, wavelength, heat, etc. supplied by the opposite wall. Therefore, the wall is preferably made of an insulating material to prevent the transfer of internal energy to the outside, resulting in heat loss.

Further, the dryer although not limiting in any way may be configured to perform a two step drying process in order to maintain the alignment of the carbon-based negative electrode active material contained within the negative electrode active layer. Specifically, the dryer may include a first dryer for drying the negative electrode slurry using light and a second dryer for drying the negative electrode slurry using heat, wherein the first dryer and the second dryer may operate continuously to dry the negative electrode slurry.

The first dryer may be a device for drying the negative electrode slurry, and may irradiate the surface of the negative electrode slurry with light or wavelengths as described above. Generally, drying the negative electrode slurry may be accomplished by applying hot air at a high temperature. However, this requires a long drying time for the negative electrode slurry, which can disturb the alignment of the carbon-based negative electrode active materials in the negative electrode slurry. In addition, if the temperature of the hot air is increased to solve this problem, the tendency of drying on the surface of the slurry increases, so that the binder is concentrated on the surface of the slurry by the volatilizing solvent, and migration occurs, which reduces the adhesion strength of the active material layer and the negative electrode collector. The present technology can be configured to dry the electrode slurry by irradiating energy in the form of light or wavelengths using a first dryer to dry the negative electrode slurry while maintaining a high degree of alignment of the carbon-based negative electrode active material without these problems. Such a first dryer may include, for example, an ultraviolet dryer, a near-infrared dryer, a far-infrared dryer, or the like, and may include, in particular, a far-infrared dryer that emits energy with a wavelength of 1 μm or more, more specifically 5 μm or more, 10 μm or more, or 20 μm or more, to achieve a uniform drying rate of the electrode slurry. Unlike near-infrared dryers or infrared dryers conventionally applied in the art, the far-infrared dryer has high energy efficiency due to its long light or wavelength. Furthermore, the far-infrared dryer has the advantage of being able to apply energy uniformly not only to the surface of the negative electrode slurry but also to its interior, thereby increasing the adhesion between the negative electrode slurry and the negative electrode collector in a short time.

In this case, the first dryer may emit energy at an output density of 50 kW/m$^2$ to 1,000 kW/m$^2$, and more specifically, may emit energy at an output density of 50 kW/m$^2$ to 500 kW/m$^2$: of 50 kW/m$^2$ to 250 kW/m$^2$: or of 50 kW/m$^2$ to 200 kW/m$^2$. By controlling the power density of the first dryer to the above range, the present technology can prevent an excessive power density from inducing uneven drying of the active material layer.

Further, the second dryer may apply heat to the negative electrode slurry that has been pre-dried by light or wavelength to ensure uniform complete drying. Such second dryers may include, without limitation, those conventionally applied in the art, but may include, in particular, hot air dryers, vacuum ovens, and the like, either singly or in combination.

The magnetic alignment device according to the present disclosure, having the above-described configuration, can reflect the state of the negative electrode slurry in real time to uniformly guide the alignment of the carbon-based negative electrode active material therein, so that the produced negative electrode can show the effect of increasing the mobility of lithium ions and decreasing the resistance during charging and discharging of the battery, thereby improving the charging and discharging performance.

Method of Manufacturing Negative Electrode

The present invention also provides, in one embodiment, a method of manufacturing negative electrode.

The method of manufacturing negative electrode comprises, applying a negative electrode slurry comprising a carbon-based negative electrode active material on a negative electrode collector;

aligning the carbon-based cathode active material contained in the cathode slurry using a magnetic alignment device; and drying the negative electrode slurry in which the carbon-based negative electrode active material is aligned to form a negative electrode active layer, the step of aligning the carbon-based cathode active material provides a method of producing a negative electrode controlled by adjusting the spacing between the negative electrode slurry and the magnet part of the magnetic alignment device according to a loading amount of the negative electrode slurry.

A method of manufacturing a negative electrode according to the present disclosure may include applying a negative electrode slurry comprising a carbon-based negative electrode active material on a negative electrode collector, and applying a magnetic field to a surface of the applied negative electrode slurry using a magnetic alignment device described above to align the carbon-based negative electrode active material in the negative electrode slurry perpendicular to the surface of the negative electrode collector (or to the traveling direction of the electrode sheet). Furthermore, the above method may be followed by subsequent drying of the negative electrode slurry to form a negative electrode active layer in which the vertical alignment of the carbon-based negative electrode active material is maintained.

The method of manufacturing the negative electrode may utilize the magnetic alignment device described above to reflect the state of the negative electrode slurry, specifically the loading amount, in real time to uniformly guide the alignment of the carbon-based negative electrode active material therein, so that the manufactured negative electrode may exhibit the effect of increasing the mobility of lithium ions and decreasing the resistance during charging and discharging of the battery, thereby improving the charging and discharging performance.

Here, applying the negative electrode slurry to the negative electrode collector and drying the negative electrode slurry may be performed in a manner conventionally applied in the art.

Further, applying the negative electrode slurry in applying the negative electrode slurry may be applied to have a certain range of loading amount considering the alignment efficiency of the carbon-based negative electrode active material contained in the negative electrode slurry and the drying efficiency of the negative electrode slurry.

In one example, the negative electrode slurry may be applied with a loading amount of 100 mg/25 cm' to 500 mg/25 cm', more specifically 150 mg/25 cm' to 450 mg/25 cm'; 150 mg/25 cm' to 200 mg/25 cm'; 200 mg/25 cm' to 400 mg/25 cm'; 200 mg/25 cm' to 300 mg/25 cm'; 250 mg/25 cm' to 400 mg/25 cm'; or 180 mg/25 cm' to 420 mg/25 cm'.

In addition, aligning the carbon-based negative electrode active material contained in the negative electrode slurry using the magnetic alignment device, the application condition of the magnetic field may be adjusted to increase the alignment efficiency of the carbon-based negative electrode active material. Specifically, the degree of alignment of the carbon-based negative electrode active material may be controlled by a magnetic field strength, an application time, or the like.

For example, the magnetic field may be applied with a magnetic field strength of 0.5 to 2.0 T, and more specifically, the magnetic field may be applied with a magnetic field strength of 0.9 to 1.5 T: 1.0 to 1.4 T; or 1.0 to 1.2 T. In addition, the magnetic field may be applied with a magnetic field strength of 0.1 to 0.3 T.

Further, the magnetic field may be applied for a time period of 0.1 to 20 seconds, more specifically, for a time period of 0.5 to 15 seconds: 0.5 to 12 seconds; 1 to 10 seconds; or 2 to 8 seconds.

Negative Electrode for Lithium Secondary Battery

The present invention provides, in one embodiment, a negative electrode manufactured using a magnetic alignment device as described above.

The prepared negative electrode according to the present disclosure comprises a carbon-based negative electrode active material and includes a negative electrode active layer on at least one side of the negative electrode collector, wherein the negative electrode active layer may have an alignment degree of 0.1 to 5.0 of the carbon-based negative electrode active material represented by Equation 1 below:

$$O.I = I_{004}/I_{110} \qquad \text{[Equation 1]}$$

in Equation 1, $I_{004}$ represents the area of the peak representing the (0,0,4) crystal face in an X-ray diffraction spectroscopy (XRD) measurement of the negative electrode active layer, $I_{110}$ indicates the area of the peak representing the (1,1,0) crystal face in an X-ray diffraction spectroscopy (XRD) measurement of the negative electrode active layer.

The negative electrode for a lithium secondary battery according to the present disclosure includes a negative electrode active layer comprising a carbon-based negative electrode active material on both sides of the negative electrode collector. The negative electrode active layer is a layer that embodies the electrical activity of the negative electrode, and is prepared by applying an electrode slurry comprising a negative electrode active material that realizes an electrochemical redox reaction during charging and discharging of the battery to both sides of the negative electrode collector, and then drying and rolling it. The negative electrode active layer includes a carbon-based negative electrode active material as the negative electrode active material to realize electrical activity through a reversible oxidation-reduction reaction during charging and discharging of the battery. Specifically, the carbon-based negative electrode active material refers to a material having carbon atoms as a main component, and such a carbon-based negative electrode active material may include graphite. The graphite may comprise one or more of natural graphite, synthetic graphite, but preferably natural graphite, or a mixture of natural graphite and synthetic graphite. For example, the carbon-based negative electrode active material may include natural or synthetic graphite alone, or in some cases, a mixture of natural and synthetic graphite. In this case, the mixture ratio of natural graphite to artificial graphite based on weight may be 5-40:60-95, or 10-30:70-90. By including natural graphite and artificial graphite in the mixing ratio as described above, the carbon-based negative electrode active material can solidify the adhesion of the negative electrode active layer to the negative electrode collector and realize a high orientation of the carbon-based negative electrode active material to the surface of the negative electrode collector.

The carbon-based negative electrode active material is preferably a spherical graphite assembly formed by aggregation of a plurality of flake graphite. The flake graphite can be natural graphite, artificial graphite, mesophase calcined carbon (bulk mesophase) made from tar and pitch, graphitized cokes (raw coke, green coke, pitch coke, needle coke, petroleum coke, etc.), and the like, and in particular, it is preferred to be assembled using a plurality of highly crystalline natural graphite. In addition, one graphite assembly may be formed from 2 to 100 pieces of flake-shaped graphite, preferably 3 to 20 pieces.

Such carbon-based negative electrode active material, specifically graphite, may have a spherical particle shape, wherein the sphericity of the graphite particles may be 0.75 or more, such as 0.75 to 1.0:0.75 to 0.95:0.8 to 0.95; or 0.90 to 0.99. Here, "sphericity" may mean the ratio of the shortest diameter (short diameter) to the longest diameter (long diameter) of any diameter passing through the center of the particle, wherein a sphericity of 1 means that the shape of the particle is spherical. The sphericity may be measured by a particle shape analyzer. The present technology has the advantage that by realizing the shape of the carbon-based negative electrode active material close to a spherical shape, the electrical conductivity of the negative electrode active layer can be realized high, thereby improving the capacity of the battery, and the specific surface area of the negative electrode active material can be increased, thereby improving the adhesion between the negative electrode active layer and the current collector.

In addition, the carbon-based negative electrode active material may exhibit an average particle diameter (D50) of 0.5 μm to 10 μm, and more specifically, may exhibit an average particle diameter (D50) of 2 μm to 7 μm: 0.5 μm to 5 μm; or 1 μm to 3 μm.

The average particle size of spherical natural graphite can be advantageous to have a smaller particle size to maximize the degree of disorder in the swelling direction for each particle to prevent the particles from swelling due to the charging of lithium ions. However, when the particle size of natural graphite is less than 0.5 μm, a large amount of binder is required due to the increase in the number of particles per unit volume, and the degree of sphericity and the yield of sphericity may be lowered. On the other hand, when the maximum particle diameter exceeds 10 μm, the swelling becomes severe, and the binding capability between particles and the binding capability between particles and current collector decreases with repeated charging and discharging, which can significantly reduce the cycle characteristics.

A negative electrode active layer comprising such a carbon-based negative electrode active material can have a controlled degree of alignment of the carbon-based negative electrode active material. By aligning the crystal face of the carbon-based negative electrode active material contained in the negative electrode active layer in a certain direction, the present technology can lower the electrode resistance, thereby further improving the charging performance of the negative electrode active layer.

Here, the degree of alignment (i.e., orientation) of the carbon-based negative electrode active material (e.g., graphite) can be determined by analyzing the crystal faces of graphite.

As one example, the negative electrode active layer may have a carbon-based negative electrode active material vertically aligned with respect to the negative electrode current collector, such that an X-ray diffraction spectroscopy (XRD) measurement of the negative electrode active layer may show the degree of alignment of the carbon-based negative electrode active material to satisfy 0.1 to 5.0 as shown by the following Equation 1:

$$O.I = I_{004}/I_{110}$$ [Equation 1]

in Equation 1, $I_{004}$ represents the area of the peak representing the (0,0,4) crystal face in an X-ray diffraction spectroscopy (XRD) measurement of the negative electrode active layer, and $I_{110}$ indicates the area of a peak representing the (1,1,0) crystal face in an X-ray diffraction spectroscopy (XRD) measurement of the negative electrode active layer.

The crystal face orientation of the carbon-based negative electrode active material can be determined by crystal face analysis of the carbon-based negative electrode active material, such as X-ray diffraction spectroscopy. The orientation index (O.I.) of the carbon-based negative electrode active material represented by Equation 1 can be an indicator of the direction in which the crystal structure of the carbon-based negative electrode active material is aligned during X-ray diffraction measurements, specifically, the degree to which the a-b axis crystal planes representing the two-dimensional planar structure of the carbon-based negative electrode active material are aligned with respect to the negative electrode collector surface. For example, if the negative electrode active layer comprises graphite as a carbon-based negative electrode active material, an X-ray diffraction spectroscopy analysis of the negative electrode active layer shows peaks for graphite at $2\theta=26.5\pm0.2°$, $42.4\pm0.2°$, $43.4\pm0.2°$, $44.6\pm0.2°$, $54.7\pm0.2°$, and $77.5\pm0.2°$. These represent the (0,0,2), (1,0,0), (1,0,1)R, (1,0,1)H, (0,0,4), and (1,1,0) crystal faces of the graphite contained in the negative electrode active layer. In general, in the case of graphite, graphene layers are placed on the a- and b-axis planes, and these graphene layers are stacked along the c-axis to form a hexagonal or rhombohedral crystal structure. The peak at $2\theta=43.4\pm0.2°$ can also be seen as an overlap of the peaks corresponding to the (1,0,1)R plane of carbon-based materials and the (1,1,1) plane of current collectors, such as Cu.

The present technology is capable of measuring the degree of alignment (O.I.) of graphite through the ratio of the areas of the peak at 20-77.5±0.2° representing the (1,1,0) plane and the peak at $2\theta=54.7\pm0.2°$ representing the (0,0,4) plane, specifically, the ratio of the areas obtained by integrating the intensities of the peaks. In addition, X-ray diffraction was measured using a Cuk α-ray as the target line, and to improve the peak intensity resolution, the target line was extracted with a monochromator device. In this case, the measurement conditions were $2\theta=10°$ to $90°$, scan speed (°/s) was 0.044 to 0.089, and step size was 0.026°/step. In addition, the (0,0,4) plane at $2\theta=54.7\pm0.2°$ represents the thickness direction characteristics (c-axis direction characteristics) of the laminated structure with the two-dimensional planar structure of the graphite layer, and the (1,1,0) plane at $2\theta=77.5\pm0.2°$ represents the planar characteristics (a-b-axis direction characteristics) of the laminated graphite layer. Therefore, the smaller the peak in the (0,0,4) plane, which represents the thickness-direction characteristics of the graphite layer plane, and the larger the peak in the (1,1,0) plane, which represents the planar characteristics of the graphite layer, the more the graphite plane is aligned at a high angle to the negative electrode collector surface. In other words, the degree of alignment (O.I.) may mean that the angle or tilt of the graphite layer surface with respect to the negative electrode collector surface is close to 90° when the value is close to 0, and the tilt with respect to the negative electrode collector surface is close to 0° or 180° when the value is larger. In this aspect, the negative electrode active layer according to the present disclosure may have a lower degree of alignment (O.I.) of graphite compared to the case where no magnetic field is applied, since the carbon-based negative electrode active material is vertically aligned with respect to the negative electrode collector. Specifically, the alignment of the carbon-based negative electrode active material in the negative electrode active layer may be from 0.1 to 5.0, and more specifically, from 0.1 to 4.5; 0.1 to 4.0; 0.1 to 3.5; 0.1 to 3.0; 0.1 to 2.5; 0.1 to 2.0; 0.1 to 1.0; 0.5 to 2.9; 1.0 to 4.5; 1.1 to 4.1; 1.5 to 4.0; 1.1 to 3.5; 1.5 to 3.0; 0.9 to 2.9; 0.1 to 2.4; 0.1 to 2.1; 0.1 to 1.9; 2.0 to 5.0; 2.0 to 4.0; 2.1 to 3.9; 2.5 to 3.9; 3.1 to 4.5; 0.1 to 0.6; 0.15 to 0.6; 0.15 to 0.5; 0.2 to 0.5; 0.2 to 0.4; 0.25 to 0.45; or 0.3 to 0.5.

As another example, the negative electrode active layer may have a degree of alignment less than or equal to 1.0 when measured by near-end X-ray fluorescence spectroscopy (NEXAFS) according to Equation 2 below:

$$S_{60/0} = \frac{I60_{B/A}}{I0_{B/A}} \quad \text{[Equation 2]}$$

(In the Equation 2, $S_{60/0}$ represents the value of the ratio of the peak intensity ($I60_{B/A}$) at an incidence angle of 60° to the ratio of the peak intensity ($I0_{B/A}$) at an incidence angle of 0° in the near-field X-ray fluorescence spectrometer (NEXAFS) measurement).

The near edge X-ray absorption spectrum, also called the near edge X-ray absorption fine structure (NEXAFS) spectrum, is the absorption spectrum observed as the electrons in the occupied valence level (1 s orbital) of the carbon atom (K-angle valence electrons) absorb the energy of the irradiated X-rays and are excited to various vacant levels.

Here, the vacant levels at which the core electrons are excited include, in natural graphite, the $\pi^*$ level, which is attributed to the antibonding orbital of sp2 bond reflecting the crystallinity (basal or oriented, etc.), the $\sigma^*$ level, which is attributed to the antibonding orbital of sp3 bond reflecting the disorder of the crystallinity (edges or undirected, etc.), or the vacant levels which is attributed to the anti-bonding orbitals such as C—H bonds or C—O bonds. In graphite, which has a crystalline structure with a laminated hexagonal network of sp2 bonds, a plane of the hexagonal network (AB plane in the following) is a basal plane, and a plane where the ends of the hexagonal network appear is the edge plane. On the edge face, the carbon may have a higher ratio of sp3 bond because of the possibility of —C=O at the end, etc.

Further, different from X-ray photoelectron spectroscopy (XPS), which measures the binding energy between atoms comprising a compound, near-field NEXAFS spectra can only reflect the surface structure of the measured graphite particles, in addition to reflecting the local structure in the vicinity of carbon atoms containing excited valence electrons. Therefore, by utilizing near-field NEXAFS spectra, the present technology can measure the crystal state (orientation) of graphite, a carbon-based negative electrode active material that forms spherical particles.

Meanwhile, the measurement of the near-field NEXAFS spectrum can be performed by an all-electron quantitative method in which the sample is irradiated with radiation light at a fixed incidence angle with respect to the sample, and the energy of the irradiated radiation light is injected from 280 eV to 320 eV, while measuring the sample current flowing in the sample to compensate for the photoelectrons emitted from the sample. Specifically, the present technology can measure the degree of alignment ($S_{60/0}$) shown in Equation 2 to more quantitatively measure the degree of alignment of the carbon-based negative electrode active material contained in the negative electrode active layer.

In general, since radiated light has a high linear polarization, the absorption peak intensity attributable to the transition from the C1s level to the $\pi^*$ level becomes larger when the incidence direction of the radiated light is parallel to the direction of the bond axis of the sp2 bond (—C=C—) of the surface graphite crystal, and the absorption peak intensity becomes smaller when it is orthogonal. As a result, highly oriented graphite (e.g., HOPG, single crystal graphite) has highly aligned graphite crystals that form sp2 bonds near the surface, so changing the angle of incidence of the radiation on the sample significantly changes the spectral shape. In contrast, a low-orientation sidelobe (e.g., a non-graphitic carbon vapor deposition film) has a low orientation of the carbon material forming the sp2 bonds near the surface, so the spectral shape changes little when the angle of incidence of the radiation to the sample is changed.

Further, when the negative electrode active layer is subjected to a near-field NEXAFS spectrum (i.e., near-field X-ray fluorescence spectroscopy (NEXAFS)) measurement with different incident angles with respect to the negative electrode active layer surface, the ratio ($I_{B/A}$) of any first absorption peak intensity ($I_A$) to any second absorption peak intensity ($I_B$) may vary with the incident angle, which may indicate that the carbon-based negative electrode active materials contained in the measured negative electrode active layer are regularly arranged (i.e., highly oriented). On the other hand, if the ratio I does not change with the angle of incidence, it may mean that the carbon-based negative electrode active materials in the measured negative electrode active layer are irregularly arranged (i.e., low-oriented).

Accordingly, the present technology measures near-field NEXAFS spectra (i.e., near-field X-ray fluorescence spectroscopy (NEXAFS)) to measure the degree of alignment of the carbon-based negative electrode active material contained in the negative electrode active layer, wherein the radiation light is incident at different incidence angles (0° and) 60° to the negative electrode active layer, and for each incidence angle, the ratio of the absorption peak attributable to the transition from the C1s level to the $\pi^*$ level (peak A=287±0.2 eV) intensity to the absorption peak (peak B=293±0.2 eV) intensity attributable to the transition from the C1s level to the $\sigma^*$ level (peak A=287±0.2 eV) intensity ($I_{B/A}$), and then calculating the ratio of the intensity ratios between the incident angles (60° and 0°) ($S_{60/0}=I60_{B/A}/I0_{B/A}$), the degree of alignment of the carbon-based negative electrode active material can be quantitatively measured.

In other words, the degree of alignment of the carbon-based negative electrode active material contained in the negative electrode active layer is determined by i) the ratio of the intensity ($I60_A$) of the absorption peak (peak A=287±0.2 eV) attributable to the transition from the C1s level to the π* level measured at an incidence angle of 60° to the intensity (I60$_B$) of the absorption peak (peak B=293±0.2 eV) attributable to the transition from the C1s level to the σ* level, as shown in Equation 3.2 eV) to the intensity (I60$_B$), yielding the ratio (I60$_{B/A}$); ii) the absorption peak attributable to the transition from the C1s level to the π* level measured at an incidence angle of 0°, as shown in Eq. 4 (peak A=287±0.2 eV) intensity (I0$_A$) to the absorption peak (peak B=293±0.2 eV) intensity (I0$_B$) attributable to the transition from the C1s level to the σ* level (peak A=287±0.2 eV) intensity (I0$_{B/A}$); and iii) can be evaluated by obtaining the ratio of them (S$_{60/0}$=I60$_{B/A}$/I0$_{B/A}$) as shown in Equation 2:

$$I60_{B/A} = \frac{I60_B}{I60_A} \qquad \text{[Equation 3]}$$

$$I0_{B/A} = \frac{I0_B}{I0_A} \qquad \text{[Equation 4]}$$

in Equation 3 and Equation 4,

I60$_A$ represents the intensity of the strongest peak present at 286±1.0 eV, at an incidence angle of 60°, I60$_B$ represents the intensity of the strongest intensity of the peak present at 292.5±1.0 eV at an incidence angle of 60°, I0$_A$ represents the intensity of the strongest peak at 286±1.0 eV at an incidence angle of 0°, I0$_B$ represents the intensity of the peak having the strongest intensity among the peaks present at 292.5±1.0 eV at an incidence angle of 0°.

Here, S$_{60/0}$ may mean that the closer to 1, the lower the alignment of the graphite crystal, and the closer to 0, the higher the alignment of the graphite crystal. The cathode active layer according to the present disclosure may satisfy the value (S$_{60/0}$) according to Equation 2 as 1.0 or less, more specifically as 0.9 or less, 0.8 or less, 0.7 or less, 0.1 to 0.7; or 0.3 to 0.7.

Further, the negative electrode active layer may uniformly induce a vertical alignment of the carbon-based negative electrode active material with respect to the negative electrode collector such that the alignment degree deviation of the plurality of carbon-based negative electrode active materials arbitrarily measured in a unit area is low.

In one example, the negative electrode active layer may have a deviation from the carbon-based negative electrode active material alignment represented by Equation 1 in an X-ray diffraction spectroscopy (XRD) measurement of any three points present in a unit area (10 cm×10 cm) of the negative electrode active layer of less than 5% based on an average value, and may be more specifically less than 4%, less than 3%, less than 2%, or less than 1%.

As another example, the negative electrode active layer according to the present disclosure may have a deviation of the degree of alignment of the carbon-based cathode active material represented by Eq. 2 from the average value of less than 5% when measured by near-end X-ray fluorescence spectroscopy (NEXAFS) for any three points present in a unit area (10 cm×10 cm) of the negative electrode active layer, and may be less than 4%, less than 3%, less than 2%, or less than 1%.

Meanwhile, the negative electrode active layer according to the present disclosure may optionally further comprise, in addition to the negative electrode active material, a conductor, a binder, and other additives, etc. as needed.

The conductor may include one or more types of carbon black, acetylene black, ketene black, carbon nanotubes, carbon fibers, and the like, but is not limited thereto.

As one example, the negative electrode active layer may contain carbon nanotubes or carbon fibers as a coating material alone or in combination.

In such a case, the content of the conductor may be from 0.1 to 10 parts by weight, more specifically from 0.1 to 8 parts by weight, from 0.1 to 5 parts by weight, from 0.1 to 3 parts by weight, or from 2 to 6 parts by weight, based on a total of 100 parts by weight of the negative electrode active layer. By controlling the content of the conductor to a range as described above, the present technology can prevent the resistance of the negative electrode from increasing due to a low content of the conductor, thereby reducing the charging capacity. Furthermore, by controlling the content of the conductor to the above range, the present technology can prevent the content of the negative electrode active material from decreasing due to an excessive amount of the conductor, resulting in a decrease in the charging capacity, or a decrease in the fast charging characteristics due to an increase in the loading amount of the negative electrode active layer.

In addition, the binder can be appropriately applied as a component that assists in the bonding of the active material and the conductor and the bonding to the current collector to the extent that it does not degrade the electrical properties of the electrode, such as vinylidene fluoride-hexafluoropropylene copolymer (PVDF-co-HFP), polyvinylidenefluoride (PVdF), and polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, ethylene-propylene-diene monomer, sulfonated ethylene-propylene-diene monomer, styrene butadiene rubber, and fluorinated rubber.

The content of the binder may be from 0.1 to 10 parts by weight, more particularly from 0.1 to 8 parts by weight, from 0.1 to 5 parts by weight, from 0.1 to 3 parts by weight, or from 2 to 6 parts by weight, based on a total of 100 parts by weight of the negative electrode active layer. By controlling the content of the binder contained in the negative electrode active layer to the above range, the present technology can prevent the adhesive strength of the active layer from being reduced due to a low content of binder or the electrical properties of the electrode from being reduced due to an excess of binder.

Moreover, the negative electrode current collector is not particularly limited as long as it has a high conductivity without causing chemical changes in the battery, and for example, copper, stainless steel, nickel, titanium, calcined carbon, and the like can be used, and in the case of copper or stainless steel, a surface treatment with carbon, nickel, titanium, silver, and the like can also be used. In addition, the average thickness of the negative electrode current collector may be appropriately applied from 1 to 500 μm in consideration of the conductivity and total thickness of the negative electrode to be prepared.

Hereinafter, the present invention will be described in more detail by way of examples and experimental examples.

However, the following examples and experimental examples are only illustrative of the present invention, and the contents of the present invention are not limited to the following examples and experimental examples.

Examples 1 and 2. Preparation of Negative Electrode for Lithium Secondary Battery A negative electrode for a lithium secondary battery was manufactured using the magnetic alignment device of the present technology having a structure as shown in FIG. 1, but with the number of non-contact measuring devices introduced in the loading amount measuring part adjusted as shown in Table 1.

Specifically, natural graphite was first used to prepare the negative electrode active material, and 97 parts by weight of the negative electrode active material and 3 parts by weight of styrene butadiene rubber (SBR) were mixed with water to form a negative electrode slurry, and then the negative electrode slurry was cast on a copper sheet that was being transported in a roll-to-roll transfer (transfer speed: 3 m/min) using a die coater.

At this time, the negative electrode slurry was cast on the copper sheet for 20 seconds so that the average loading amount of the applied negative electrode slurry was 200 mg/25 cu', and the negative electrode slurry was cast on the copper sheet for 20 seconds so that the average loading amount of the successively applied negative electrode slurry was 400 mg/25 cm'.

Then, a magnetic field was applied to the negative electrode slurry by moving the copper sheet so that the applied negative electrode slurry passed through the loading amount measuring part and passed between the first magnet part and the second magnet part.

At this time, the loading amount measuring part includes a web gauge as a non-contact measuring instrument, and the confocal measuring instruments are included in the number indicated in Table 1 below along the direction of travel of the copper sheet. Further, the loading amount of the negative electrode slurry measured by the loading amount measuring part was transmitted to the control part, and the control part recognized the measured negative electrode slurry loading amount and the corresponding gap reference value by comparing it with the gap reference value stored in the database, and transmitted the recognized gap reference value to the first magnet part and the second magnet part, respectively.

Moreover, the first magnet part and the second magnet part adjusted the distance adjustment means to adjust the separation distance of the first unit permanent magnet and the second unit permanent magnet fixed on the support part to the spacing reference value transmitted from the control part. Here, the separation distance between the first unit permanent magnet and the second unit permanent magnet was adjusted from 20 to 40 mm according to the spacing reference value transmitted from the control part, and the intensity of the applied magnetic field was 1.0T.

TABLE 1

|  | Number of web gauge |
|---|---|
| Example 1 | 1 |
| Example 2 | 2 |

A negative electrode for a lithium secondary battery was prepared by drying the negative electrode slurry by moving a copper sheet with a magnetic field applied to the negative electrode slurry to the drying part.

Comparative Example 1. Preparation of Negative Electrode for Lithium Secondary Battery The negative electrode for a lithium secondary battery was prepared by performing the same method as in Example 1, except that a magnetic alignment device that does not include a loading amount measurement part and a control part was used. In this case, the separation distance between the first unit permanent magnet of the first magnet part and the second unit permanent magnet of the second magnet part was adjusted to 30 mm.

Experimental example. Evaluation of alignment uniformity of carbon-based negative electrode active material The following experiments were conducted to evaluate the alignment uniformity of the carbon-based negative electrode active material as a performance of the magnetic alignment device according to the present disclosure.

Specifically, for each negative electrode manufactured in the Example and Comparative Examples, a first unit area (10 cm×10 cm) within the casting area with an average loading amount of 200 mg/25 cm' of negative electrode slurry and a second unit area (10 cm×10 cm) within the casting area with an average loading amount of 400 mg/25 cm' of negative electrode slurry were arbitrarily set.

Then, X-ray diffraction spectroscopy (XRD) and near-end X-ray fluorescence spectroscopy (NEXAFS) were performed on three random points of the first and second unit areas, respectively, to measure the spectra.

The measurement conditions for the near-end X-ray fluorescence spectroscopy (NEXAFS) and X-ray diffraction spectroscopy (XRD) were as follows:
1) Near-End X-Ray Fluorescence Spectroscopy (NEXAFS)
   Acceleration voltage: 1.0 GeV to 1.5 GeV
   Accumulation current: 80 to 350 mA
   Incidence angle: 60° or 0
2) X-Ray Diffraction Spectroscopy (XRD)
   Target: Cu (Kα-ray) graphite monochromator
   Slit: Divergence slit=1 degree, Reception slit=0.1 mm, Scattering slit=1 degree From the spectrum measured under the above conditions, i) the average degree of alignment (i.e., the average value of the alignment of each point) and ii) the error rate of each point and the average degree of alignment were calculated for each carbon-based negative electrode active material according to Equation 1 and Equation 2, respectively. The results are shown in Table 2.

$$O.I = I_{004}/I_{110}$$ [Equation 1]

in Equation 1, $I_{004}$ represents the area of the peak representing the (0,0,4) crystal face in the X-ray diffraction spectroscopy (XRD) measurement of the negative active layer, $I_{110}$ represents the area of the peak representing the (1,1,0) crystal face in an X-ray diffraction spectroscopy (XRD) measurement of the negative active layer.

$$S_{60/0} = \frac{I60_{B/A}}{I0_{B/A}}$$ [Equation 2]

in Equation 2, $S_{60/0}$ represents the value of the peak intensity ratio ($I60_{B/A}$) at an incidence angle of 60° to the peak intensity ratio ($I0_{B/A}$) at an incidence angle of 0° for near-end X-ray fluorescence spectrometer (NEXAFS) measurements.

TABLE 2

|  | O.I ($I_{004}/I_{110}$) | | $S_{60/0}$ | |
|---|---|---|---|---|
|  | Average value | Error rate | Average value | Error rate |
| Comparative Example 1 | 0.75 | 8.5 ± 0.2% | 1.02 | 8.8 ± 0.2% |

TABLE 2-continued

| | O.I ($I_{004}/I_{110}$) | | $S_{60/0}$ | |
|---|---|---|---|---|
| | Average value | Error rate | Average value | Error rate |
| Example 1 | 0.25 | 2.2 ± 0.1% | 0.72 | 2.1 ± 0.2% |
| Example 2 | 0.22 | 1.7 ± 0.1% | 0.69 | 1.5 ± 0.2% |

As shown in the Table 2, the negative electrode prepared using the magnetic alignment device according to the present technology was found to have a high degree of alignment of the carbon-based negative electrode active material contained in the negative electrode active layer. In addition, the negative electrode active layer of the prepared negative electrode was found to have a low error rate of 3% or less of the degree of alignment of any three points and the average value thereof. This means that the magnetic alignment device according to the present technology aligned the carbon-based negative electrode active material uniformly on the negative electrode collector with a high degree of alignment.

From these results, it can be seen that the magnetic alignment device according to the present technology was capable of aligning the carbon-based negative electrode active material uniformly on the negative electrode collector with a high degree of alignment by measuring the loading amount of the negative electrode slurry in real time and reflecting it in the spacing between the first and second magnetic parts.

Although the above has been described with reference to a preferred exemplary embodiment of the present invention, it will be understood by those skilled in the art or having ordinary knowledge of the art that various modifications and changes can be made to the present invention without departing from the ideas and technical scope of the present invention described in the following claims.

Accordingly, the technical scope of the present invention is not limited to what is described in the detailed description of the specification, but should be defined by the patent claims.

REFERENCE NUMERALS

10: MAGNETIC ALIGNMENT DEVICE
20: TRANSFER PART
30: COATING PART (DIE COATER)
110: LOADING AMOUNT MEASURING PART
111: FIRST WEB GAUGE
112: SECOND WEB GAUGE
120a: FIRST MAGNET PART
121a: FIRST DISTANCE ADJUSTMENT MEANS
122a: FIRST SINGLE PERMANENT MAGNET
120b: SECOND MAGNET PART
121b: SECOND DISTANCE ADJUSTMENT MEANS
122b: SECOND SINGLE PERMANENT MAGNET
130: CONTROL PART
140: DRYING PART
C: NEGATIVE ELECTRODE CURRENT COLLECTOR
S: NEGATIVE ELECTRODE SLURRY

The invention claimed is:

1. A magnetic alignment device for a negative electrode in which a negative electrode slurry including a carbon-based negative electrode active material is applied to a negative electrode sheet applied on a negative electrode collector to orient the carbon-based negative electrode active material by applying a magnetic force, the magnetic alignment device for negative electrode, comprising:
   a first magnet part and a second magnet part arranged at an upper portion and a lower portion of traveling electrode sheet, respectively;
   a loading amount measuring part arranged upstream of the first magnet part and the second magnet part relative to the travelling direction of the electrode sheet, and measuring the loading amount of the negative electrode slurry arranged on the electrode sheet; and
   a control part for adjusting a separation distance between the first magnet part and the second magnet part according to a loading amount of the negative electrode slurry measured by the loading amount measuring part.

2. The magnetic alignment device for negative electrode of claim 1, wherein the control part is equipped with a database in which an interval reference values of the first magnet part and the second magnet part according to the loading amount of the negative electrode slurry are stored, and the interval reference values corresponding to the loading amount of the negative electrode slurry measured by the loading amount measuring part are calculated to adjust the separation distance of the first magnet part and the second magnet part.

3. The magnetic alignment device for negative electrode of claim 1, wherein the first and second magnet parts each comprise a single permanent magnet arranged in the width direction of the driving negative electrode slurry; a support part to which the single permanent magnet is fixed; and distance adjustment means connected to the support part and inducing a lifting movement of the support part in a direction perpendicular to the traveling electrode sheet.

4. The magnetic alignment device for negative electrode of claim 1, wherein the separation distance between the first magnet part and the second magnet part is adjusted from 10 mm to 50 mm.

5. The magnetic alignment device for negative electrode of claim 1, wherein the first magnet part and the second magnet part comprise magnets having opposite poles.

6. The magnetic alignment device for negative electrode of claim 1, wherein the loading amount measuring part comprises at least one of a web gauge and an ultrasonic sensor.

7. The magnetic alignment device for negative electrode of claim 6, wherein the ultrasonic sensor comprises:
   an ultrasonic generating portion that injects ultrasonic waves onto a surface of the negative electrode slurry;
   an ultrasonic receiving part that scans the negative electrode slurry loaded with ultrasonic waves generated by the ultrasonic generating portion and receives the returned ultrasonic waves; and
   a data transmission part calculates the loading amount of the negative electrode slurry from the data obtained by the scan and transmits it to the control part.

8. The magnetic alignment device for negative electrode of claim 1, wherein the magnetic alignment device comprises a drying part for drying the negative electrode slurry in which the carbon-based negative electrode active material is aligned by the first magnet part and the second magnet part.

9. A method of manufacturing negative electrode, comprising:
   applying a negative electrode slurry comprising carbon-based negative electrode active material on a negative electrode collector;

aligning the carbon-based negative electrode active material contained in the negative electrode slurry using a magnetic alignment device according to claim 1; and drying the negative electrode slurry in which the carbon-based negative electrode active material is aligned to form a negative electrode active layer, the step of aligning the carbon-based negative electrode active material provides a method of producing a controlled negative electrode by adjusting the spacing between the negative electrode slurry and the magnet part.

10. The method for manufacturing negative electrode of claim 9, wherein the negative electrode slurry is applied in a loading amount of 100 mg/25 cm' to 500 mg/25 cm'.

11. The method for manufacturing negative electrode of claim 9, wherein the negative electrode active layer has an alignment degree of the carbon-based negative electrode active material of 0.1 to 5.0 shown in the following equation 1:

$$O.I = I_{004}/I_{110} \qquad \text{Equation 1}$$

in Equation 1, $I_{004}$ represents the area of the peak representing the (0,0,4) crystal face in an X-ray diffraction spectroscopy measurement of the negative electrode active layer, and $I_{110}$ represents the area of the peak representing the (1,1,0) crystal face in an X-ray diffraction spectroscopy measurement of the negative electrode active layer.

* * * * *